United States Patent [19]

Anderson

[11] Patent Number: 4,512,940
[45] Date of Patent: Apr. 23, 1985

[54] METHOD AND APPARATUS FOR THE PRODUCTION OF ELECTRET MATERIAL

[75] Inventor: Jeff L. Anderson, Cambridge, Ohio

[73] Assignee: NCR Corporation, Dayton, Ohio

[21] Appl. No.: 450,311

[22] Filed: Dec. 16, 1982

[51] Int. Cl.³ .......................... H01G 7/02; B29D 7/22
[52] U.S. Cl. ....................................... 264/22; 264/24; 264/25; 264/104; 361/233; 425/174.4; 425/174.8 E
[58] Field of Search ...................... 264/22, 24, 25-27, 264/104; 425/174.4, 174.8 R, 174.8 E; 361/233

[56] References Cited

U.S. PATENT DOCUMENTS

| 2,740,184 | 4/1956 | Thomas | 28/78 |
| 3,878,274 | 4/1975 | Murayama et al. | 264/24 |
| 3,885,301 | 5/1975 | Murayama | 29/592 |
| 4,127,681 | 11/1978 | Ferren et al. | 264/22 |
| 4,166,088 | 8/1979 | Neefe | 264/22 |
| 4,348,711 | 9/1982 | Else et al. | 361/233 |
| 4,375,718 | 3/1983 | Wadsworth et al. | 264/22 |

FOREIGN PATENT DOCUMENTS 48-13712  4/1973  Japan ..................................... 264/22

Primary Examiner—Jeffery Thurlow
Attorney, Agent, or Firm—J. T. Cavender; Wilbert Hawk, Jr.; Richard W. Lavin

[57] ABSTRACT

An electret material is formed by the method which includes the step of passing a pair of electrical conductor elements along the surface of a dielectric material heated to a predetermined temperature. The conductor elements are supported between a pair of support members driven in a direction to move the conductor elements along the surface of the dielectric material for applying an electrical field to the material. A heating element positioned adjacent the surface of the dielectric material and movable with the conductor element heats an area of the dielectric material located between the conductor elements enabling the material to be polarized by the electrical field, thereby producing an electret.

5 Claims, 6 Drawing Figures

METHOD AND APPARATUS FOR THE PRODUCTION OF ELECTRET MATERIAL

BACKGROUND OF THE INVENTION

The present invention is directed to a method and apparatus for the low cost production of an electret material.

Materials known as "electret" are those prepared by maintaining a film, sheet, or other shaped particle of a plastic composed of a polymeric or organic material such as carnauba wax or naphthalene; or polar resin such as polyfluorovinylidene rosin, a polyvinyl chloride rosin, polycarbonate, polyester, and acrylic rosin, etc.; a non-polar rosin such as polyethylene, polypropylene, polystyrene, etc. or copolymers of them; or a mixture of these materials at a suitable temperature for a long period of time under the application of a D.C. potential and cooling the article to room temperature while maintaining the D.C. potential, resulting in the polarization of the material. Because such an electret can maintain its polarized state for a long period of time as well as have excellent workability, toughness and flexibility, the electret is widely used in transformers such as speakers and microphones and also in other specific fields. Prior art methods for producing electrets are disclosed in U.S. Pat. Nos. 3,885,301, 3,748,727 and 4,348,711. The methods for the production of electrets disclosed in the above cited references have required the need of a high voltage source for generating an electrical field which is applied across the shortest dimension of the electret to produce the polarized state of the electret, which requirement increases the cost of the electret. It is therefore a principal object of this invention to manufacture electrets at a relatively low cost. It is another object of this invention to produce electrets at a relatively high rate of speed.

SUMMARY OF THE INVENTION

These and other objects of the invention are fulfilled by moving two electrical conductors positioned adjacent one surface of a sheet of polymer-type dielectric material, which has been heated to a temperature higher than the last transition point of the material and lower than the melting point of the material by a lamp member producing infrared energy focused on the polymer material. The electrical conductors move on a movable support member which also supports the lamp member therebetween. A lens member positioned between the lamp member and the dielectric material focuses the rays of the lamp member onto the material between the electrical conductors. Movement of the support member adjacent the surface of the polymer material supplies a polarizing voltage across a long dimension of the material to produce an electret whose polarization is perpendicular to the polarization of the electret material produced by prior methods.

BRIEF DESCRIPTION OF THE DRAWING

The foregoing and various other objects, advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
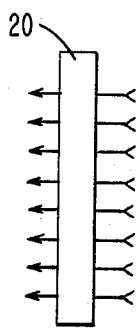
FIG. 1 is a side view of an electret of the prior art showing the direction of the electrical field applied during the polarization of the material.
Figure 2:
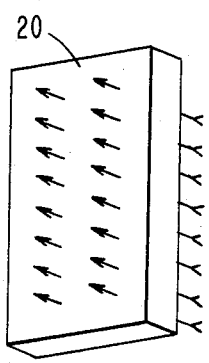
FIG. 2 is an oblique view of the electret-forming material of FIG. 1.

Referring now to FIGS. 1 and 2, there is shown views of a prior art electret-forming material 20 in which the electrical field is applied during the polarization of the material in a direction through the shortest dimension of the material or perpendicular to the longitudinal axis of the material. This arrangement requires the employment of a high voltage electrical field as indicated by the arrows in FIGS. 1 and 2. The present invention directs the electrical field in a direction along the longest dimension of the material as indicated by the arrow shown in FIGS. 3 and 4. It has been found that in moving a pair of electrical conductors or electrodes along the surface of the material 20 in a direction parallel to the longitudinal axis of the material, polarization of the material will occur using a voltage which is directly proportional to the distance between the conductors and the material but independent of the thickness of the material. This polarization will be parallel to the surface of the material, and will extend into the material to a depth which can be controlled by the distance between the surface of the material and the electrical conductors.

Figure 5:
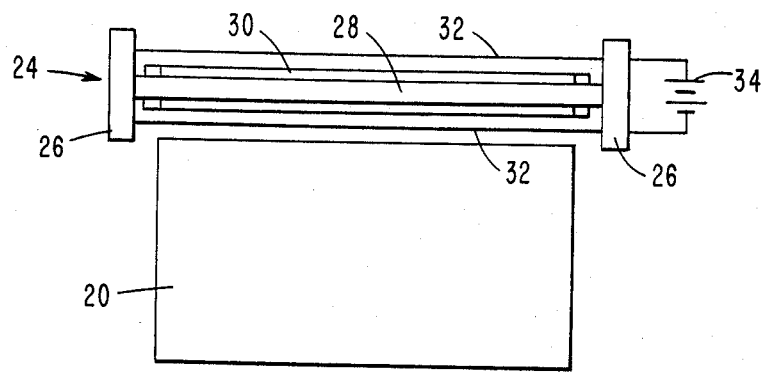
FIG. 5 is a schematic representation of the top view of a carriage assembly in which is mounted the electrical conductors, the infrared lamp and the focusing lens used in producing the electret.
Figure 6:
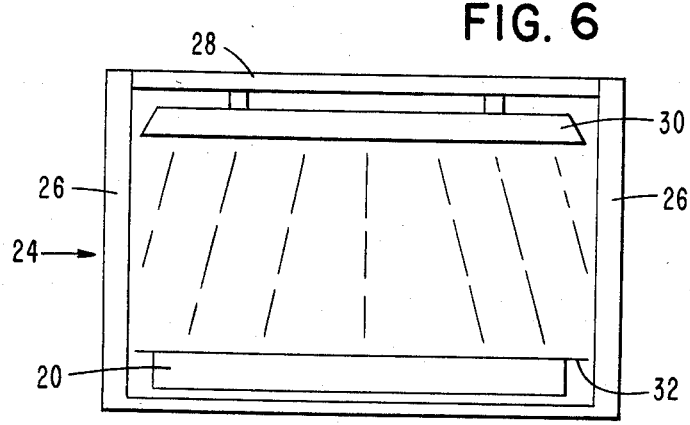
FIG. 6 is a schematic representation of the side view of the carriage assembly.

Referring now to FIGS. 5 and 6, there is shown a schematic representation of the top and front view of an apparatus for polarizing a dielectric material to produce an electret. The apparatus comprises a carriage assembly generally indicated by the numeral 24 and which includes a pair of oppositely positioned support members 26 between which is mounted a source of radiant energy such as a Quartz infrared lamp 28, a focusing lens 30 and a pair of electrical conductors 32 connected to a suitable power supply 34. The assembly 24 is driven along the edge of the material 20. The lamp 28 provides a line source of radiant energy which is focused by the lens 30 to a position between the conductors 32 for heating the material 20 as the carriage assembly 24 moves past the surface of such material.

The power required to polarize the material 20 varies with the distance between the conductors 32 and the type of material to be polarized. In the present example, a voltage of 320K volts per inch of distance between the conductors and the material is required. The distance between the lamp 28 and the surface of the material 20 is not critical since the focal length of the lens 30 can be selected with respect to the location of the lamp 28 to focus the radiant energy generated by the lamp 28 at the surface of the material 20. In order to avoid arcing between the conductors 32, the conductors may be coated with an insulating material such as Mylar, a trademark of the DuPont Corporation of Wilmington, Del. The conductors 32 may engage the surface of the material during the movement of the carriage assembly 24 without detracting from the polarization of the material. The speed of the carriage assembly 24 is selected to allow the area of the material heated by the radiant energy of the lamp 28 to become cool while still within the electrical polarizing field of the conductors 32. In the present example, if the thickness of the dielectric material is 5 mils and the temperature ranges between a high of 120° C. and a low of 80° C., a maximum speed of 150 inches per second can be attained where the conductors 32 are spaced 0.1 inch apart and are located 0.010 inch from the surface of the material 20.

Figures 3, 4:
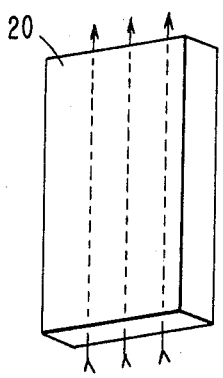
FIG. 3 is a side view of an electret-forming material of the present invention showing the direction of the electrical field applied during the polarization of the material.
FIG. 4 is an oblique view of the electret-forming material of FIG. 3.

As the carriage assembly 24 moves along the surface of the polymer material 20, the conductors 32 will generate an electrical field in a direction parallel to the longitudinal axis of the sheet of material 20, as shown in FIGS. 3 and 4. The lens 30 will focus the radiant energy generated by the lamp 28 along a line on the surface of the material 20 located between the conductors 32 and heat the material to a level enabling the electrical field produced by the conductors 32 to polarize the material. The movement of the carriage assembly 24 allows the heated material to cool by the time it reaches the downstream conductor 32, thereby enabling the material to maintain its polarized state.

While the principles of the invention have now been made clear in an illustrated embodiment, it will be obvious to those skilled in the art that many modifications of structure, arrangements, elements and components can be made which are particularly adapted for specific environments without departing from this principle. It is obvious that the carriage assembly 24 can be stationary, while the sheet of dielectric material 20 moves past the assembly 24 to have the material polarized, thereby producing an electret. The appended claims are therefore intended to cover and embrace any such modifications within the limits only of the true spirit and scope of the invention.

I claim:

1. The method of polarizing a dielectric material to form an electret which includes the steps of:
   positioning spaced-apart first and second electrodes adjacent the same surface of the dielectric material;
   connecting the electrodes to a source of voltage with each electrode having an opposite polarity enabling the electrodes to apply an electrical field to the longitudinal area of the dielectric material located between the electrodes;
   locating a source of radiant energy spaced from and between the electrodes;
   applying the radiant energy on the dielectric material polarized by the electrical field;
   and moving the electrodes and the source of radiant energy along the same surface of the dielectric material at a rate of speed enabling the polarized area of the dielectric material to return to its initial temperature upon reaching the second electrode.

2. The method of claim 1 in which the step of applying the radiant energy includes the step of placing a focusing optical lens member between the source of radiant energy and the electrodes to focus the radiant energy on the dielectric material located between the electrodes.

3. An apparatus for producing an electret comprising:
   a movable support member positioned adjacent a sheet of dielectric material which exhibits a residual polarization after being subjected to a polarization-enabling energy and to a polarizing electrical field;
   a pair of spaced-apart electrode members mounted on said support member and positioned adjacent the same surface of the dielectric material;
   a source of voltage connected to said electrode members enabling the electrode members to be of opposite polarity for applying a polarizing electrical field along the longitudinal axis of the dielectric material in the area located between said electrode members;
   a source of polarizing-enabling energy mounted on said movable support member;
   and means for directing said polarizing-enabling energy on the longitudinal area of the sheet of dielectric material located between the electrode members enabling the dielectric material to exhibit a residual polarization.

4. The apparatus of claim 3 in which said source of polarizing-enabling energy comprises an infrared lamp member.

5. The apparatus of claim 4 in which said directing means comprises an optical lens member mounted on said support member between the infra-red lamp and the electrode members to focus said polarizing-enabling energy on the one surface of the dielectric material located between the electrode members.

* * * * *